Dec. 2, 1969    R. NEUSCHOTZ    3,481,022
TOOL FOR INSTALLING THREADED PARTS, AND RELATED METHODS
Filed Sept. 21, 1965    2 Sheets-Sheet 2
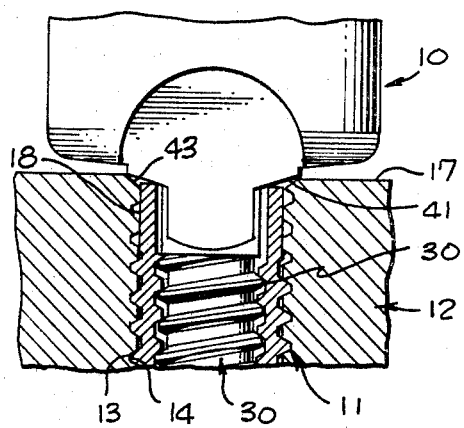
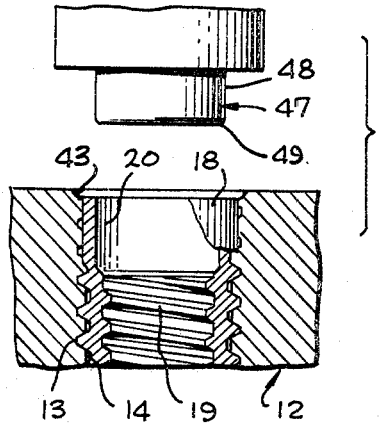
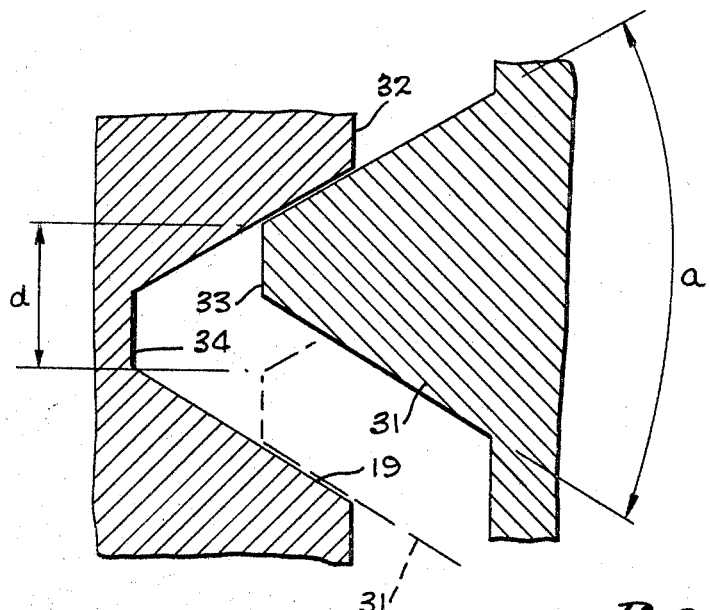
INVENTOR.
ROBERT NEUSCHOTZ
BY William P. Green
ATTORNEY

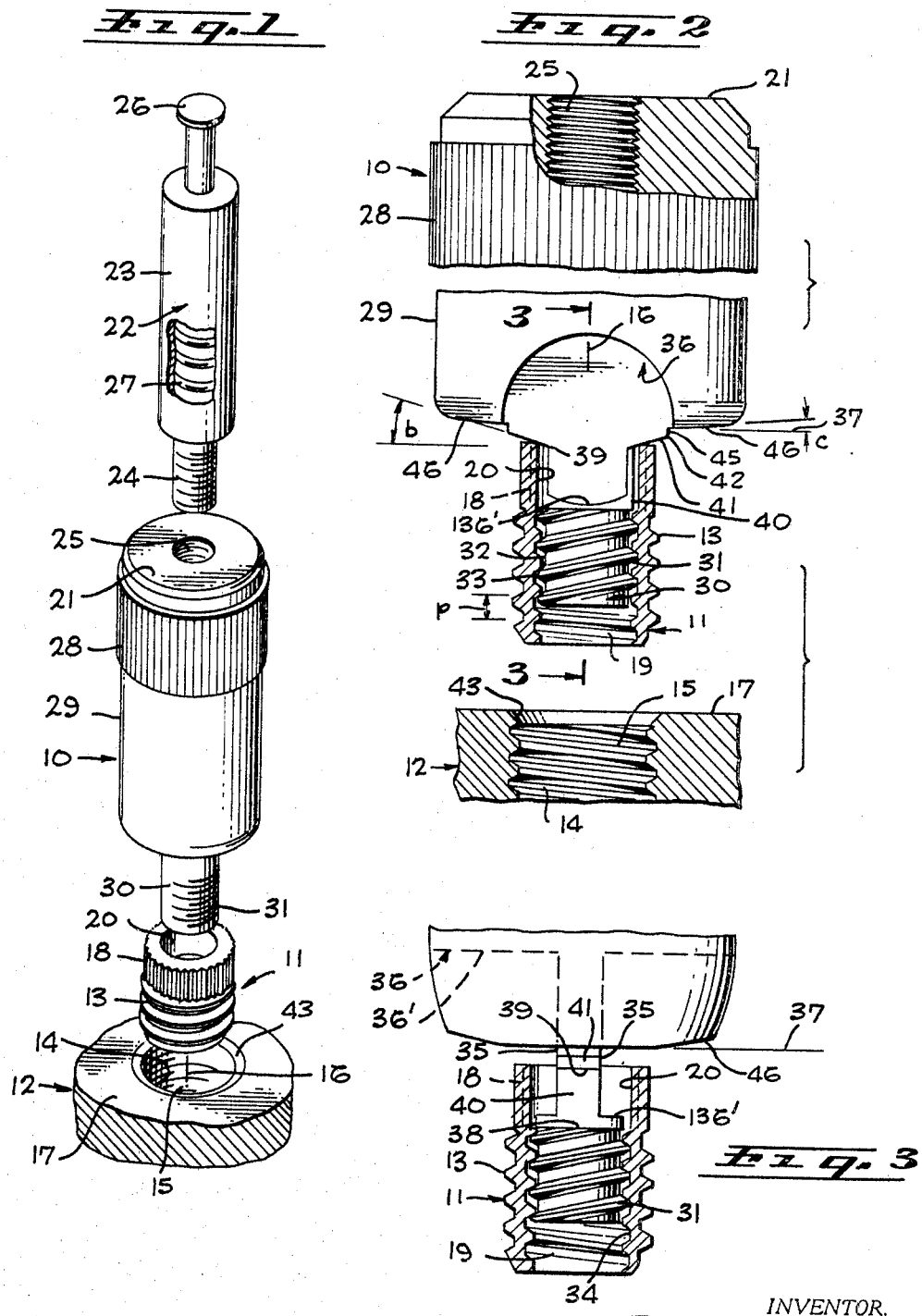

United States Patent Office 3,481,022
Patented Dec. 2, 1969

3,481,022
TOOL FOR INSTALLING THREADED PARTS, AND RELATED METHODS
Robert Neuschotz, 1162 Angelo Drive, Beverly Hills, Calif. 90210
Filed Sept. 21, 1965, Ser. No. 488,879
Int. Cl. B23p 19/04
U.S. Cl. 29—456                                                 10 Claims

ABSTRACT OF THE DISCLOSURE

A method and tool for installing a threaded element within a carrier part, the tool having threads which engage threads of the element to be installed, but are dimensioned to have a loose fit relative thereto enabling limited axial movement of the tool threads relative to the threads of the element, so that the tool may first be actuated to screw the element into the carrier part, and may then be driven axially, with the tool acting upon such axial movement to deform a portion of the threaded element and by such deformation lock the element against unwanted removal from the carrier part.

---

This invention relates to improved methods and apparatus for installing threaded elements, such as internally and externally threaded inserts, within a carrier part. Certain features of the methods and apparatus disclosed in the present application have been shown and claimed in copending application Ser. No. 405,647, filed Oct. 8, 1964, by Robert Neuschotz and Cullen E. James, on "Locking Of Threaded Parts Against Removal," now Patent No. 3,297,071.

The elements with whose installation the present invention is concerned are of a type having a first set of threads adapted to be screwed into an opening in a carrier part, and a second set of threads to which a screw or other member may be connected, to attach that member to the carrier part through the medium of the installed element. The element may be screwed into the carrier part by means of a tool, with the tool desirably being connected to the element, during installation, by the second set of threads.

A major object of the invention is to provide an improved arrangement for locking the installed element against unscrewing rotation relative to and from the carrier part after advancement of the element into that part. This locking effect may be provided either as a temporary lock, merely for the purpose of preventing unwanted removal of the element from the carrier part as the tool is unscrewed from the element; or as a permanent lock to serve as the only means for retaining the element in the carrier part. When only a temporary or light locking action is to be accomplished prior to removal of the installing tool, a more complete locking step may be performed subsequently, by expanding a portion of the threaded element outwardly against a wall of the carrier part and into permanent locking relation with respect to that wall.

To achieve maximum simplicity in the structure of the tool, and in the installing and locking operation, I find it desirable to employ a tool having threads which will engage the discussed second set of threads of the element to be installed, but which are sufficiently loose with respect to those threads to enable limited axial movement of the tool body and its threads relative to the engaged threads of the element to be installed, after the element has been screwed into the carrier part. This limited axial motion of the tool may then be utilized to perform a staking or deforming operation on a portion of the element, to deform that portion in locking relation with respect to the carrier part. More particularly, the tool body may first be turned to screw the element into the carrier part, and then be driven axially relative to the element and the carrier part to effect the locking action. Desirably, the tool is designed to deform or stake the threaded element at one or more localized areas about the axis of that element, and not circularly entirely about that axis, so that a relatively light axial impacting force will perform the staking function.

Structurally, a tool embodying the invention may have a stop shoulder which is connected to the threads of the tool for axial movement with those threads, so that when the tool body is driven axially this stop-shoulder will engage the carrier part in a manner limiting the deforming action. This stop-shoulder may be located radially outwardly of the deforming or staking portions of the tool.

An additional feature of the invention relates to the preferred configuration of the deforming shoulder or shoulders. Specifically, these shoulders or projections may be shaped to taper radially inwardly as they advance axially, to present an inclined surface to the wall of the threaded element, and thereby deflect or deform that wall locally in both radially outward and axial directions, to maximize the locking action.

The above and other features and objects of the invention will be better understood from the following detailed description of the typical embodiment illustrated in the accompanying drawings, in which:

FIG. 1 is an exploded perspective representation of a tool assembly embodying the invention, and an insert to be installed by the tool within a carrier part;

FIG. 2 is an enlarged side view, partially in section, of the tool, insert and carrier part;

FIG. 3 is a fragmentary transverse section taken on line 3—3 of FIG. 2;

FIG. 4 is a view similar to a portion of FIG. 2, but showing the insert installed within a carrier part;

FIG. 5 is a greatly enlarged fragmentary axial section showing portions of the interfitting threads of the tool and insert; and FIG. 6 is a view similar to FIG. 4, but showing the insert after it has been deformed, the tool has been removed, and the upper portion of the insert has been expanded.

With reference first to FIG. 1, I have shown at 10 a tool constructed in accordance with the invention, and adapted to be utilized for installing an insert 11 within a carrier part 12. The insert 11 may be of the type disclosed in my copending application Ser. No. 402,379, filed Oct. 8, 1964, on "Threaded Insert Having Expandable Serrated Locking Portion." More specifically, this insert may have an essentially tubular side wall having external threads 13 dimensioned to interfit with internal threads 14 formed within a passage 15 which extends into the carrier part along an axis 16 disposed perpendicular to the outer surface 17 of the carrier part. At its axially outer end, insert 11 may have external typically axial serrations 18, which are small enough to be received within the minor diameter of threads 14 of the carrier part, and are expansible radially outwardly against and into those threads to lock the insert in passage 15. Internally, the tubular body of insert 11 may contain internal threads 19 of a standard cross section, size and shape, with an essentially axial counterbore 20 being formed in the insert at its axially outer end.

Tool 10 may be formed as an integral one-piece device, constructed of steel or other rigid material. Staking force may be applied to this tool body 10 by striking downwardly against its upper transverse end 21 with a hammer, or by means of a conventional hand operated impact device represented at 22. This device 22 may have a body 23 carrying a lower downwardly projecting threaded shank 24 which is threadedly connectible into a passage 25 formed in the body of tool 10. At its upper end, body 23 of device 22 may carry a thumb actuated plunger 26, which is adapted to be pressed downwardly relative to body 23, and which, upon such motion first compresses a spring 27 within body 23, an then at the end of the downward stroke of element 26, automatically releases the force of the spring to apply a sudden downward impacting force of known intensity to shank 24 and the attached tool body 10. Since impacting devices of the type shown at 22 are very well known in the art, this device will not be described further in the present application.

The body of tool 10 may be somewhat elongated in the direction of axis 16, and be centered about and in most respects annular about, that axis. At its upper end, the tool may be externally provided with a series of axially extending circularly spaced serrations or knurls 28, which are centered about axis 16. The previously mentioned upper surface 21 of the tool, to which the striking force of the hammer may be applied in driving the tool axially, may be disposed directly transversely of axis 16, and contain the mentioned internally threaded passage or bore 25 at its center, and also centered about axis 16. Beneath knurls 28, tool 10 may have an externally cylindrical surface 29.

At its lower end, the typically one piece tool 10 may have an integral downwardly projecting shank 30, having external threads 31 which are centered about axis 16 and are shaped to interfit with internal threads 19 in the insert, but which are loose enough within those insert threads to enable limited axial movement of shank 30 relative to the insert. Threads 31 may have the same axial pitch and lead as do threads 19, and may have the same profile (preferably each having a 60 degree included angle $a$ between their opposite side faces, as seen in FIG. 5). This profile of the internal threads 19 within the insert may be exactly in correspondence with one of the sizes of the American Standard Thread Series, except for the desirable truncation of the inner extremities of the threads to form modified minor diameter surfaces 32 which are slightly greater in diameter than would be the minor diameters of standard threads.

To enable the desired limited axial movement of threads 31 relative to threads 19, the external threads 31 of shank 30 may be undersize with respect to threads 19, as will be apparent from FIG. 5, so that each of the turns of thread 31 may shift through an axial distance $d$ between the full line and broken line positions of FIG. 5. It is desirable that threads 31 be smaller than threads 19 at both major diameter and minor diameter locations. The major diameter 33 of threads 31 may be sufficiently smaller than major diameter 34 of threads 19 to cause major diameter 33 of threads 31 to be at least as close to minor diameter 32 of threads 19 as to major diameter 34 of threads 19. However, the threads 19 and 31 must of course interfit sufficiently to transmit forces axially between these two threads without damage to either thread.

Axially outwardly of or above threads 31, as viewed in FIGS. 2 and 3, shank 30 has at its opposite sides two parallel planar surfaces or "flats" 35, which are parallel to and symmetrical with respect to axis 16, and which continue upwardly into the larger diameter portion of the tool body adjacent shank 30. These flat surfaces 35 are formed most conveniently by milling out cylindrical recesses 36 extending into opposite sides of the tool body along an axis 37. The walls of these recesses are cylindrical but not circularly continuous, and include upper wall surfaces 36' centered about axis 37, and lower arcuate wall surfaces 136' formed at the upper end of the threaded portion of shank 30.

Axially between the locations 38 and 39 (FIGS. 2 and 3), the portion of shank 31 which is not cut away forms cylindrical or partial cylindrical surfaces 40 centered about axis 16, and which may be of a diameter slightly greater than the minor diameter of threads 31. Upwardly or axially outwardly beyond the location 39 of FIGS. 2 and 3, the tool body may form two oppositely inclined or tapering staking surfaces 41, which advance radially outwardly as they advance axially to locations 42. These surfaces 41 are symmetrical with respect to axis 16, and taper at the same angle, with their points 42 preferably being located at approximately, desirably substantially exactly, the major diameter of internal threads 14 within carrier part 12. In this connection, it is noted that the carrier part preferably contains a countersink 43 at its axially outer end, which is annular about axis 16, and tapers as shown, and with its maximum diameter portion being located at approximately the major diameter of threads 14, to be engageable by points 42 in the relation illustrated in FIG. 4. In most instances, the surfaces 41 should advance more rapidly in a radial direction than in an axial direction, to deform the insert wall through a substantial axial distance. Where the tool is to be utilized for only temporarily locking the insert within the carrier part, the angle $d$ between each inclined staking surface 41 and a plane disposed transversely of axis 16 may be between about 10 and 20 degrees, desirably about 16 degrees. If the tool 10 is to be employed for effecting a final lock of the insert within the carrier part, this angle may be increased to a value in excess of 25 degrees or more, say for example about 30°. In any event, the angle $b$ should in most instances be at least about 10 degrees.

In extending upwardly beyond points 42 of FIG. 2, the tool body has short axial surfaces 45, which extend upwardly to the location of a generally transverse downwardly facing end surface 46 on the tool. This surface may be annular about axis 16, except insofar as surface 46 is interrupted by formation of the two recesses 36. Surface 46 may be disposed at a slight inclination angle $c$ with respect to a true transverse plane, to advance gradually upwardly or axially outwardly as it advances radially outwardly, with this angle typically being between about 3 and 10 degrees, and for best results about 5 degrees. Surface 46 commences at approximately the major diameter of internal threads 14 in the carrier part, and extends radially outwardly beyond that diameter to engage surface 17 of the carrier part at an outer location. The axial extent of surfaces 45 of the tool determines the extent to which the tool may be driven axially in the staking operation, and is preferably between about .005 and .020 inch, and for best results about .015 inch. This axial extent of surfaces 45 may be approximately equal to the distance $d$ of FIG. 5, but is preferably very slightly greater than distance $d$ inasmuch as there is normally some freedom for slight axial movement of the insert itself and its external threads relative to the internal threads of the carrier part during a staking operation.

To now describe the installation of an insert utilizing the tool and method of the present invention, assume first of all that the impacting device 22 has been attached to tool 10, by threaded connection of shank 24 into recess 25. With these units thus connected, insert 11 is screwed onto shank 30 to the position illustrated in FIG. 2, in which the upper end of the insert engages tapered surfaces 41 of tool 10. With the insert thus carried on the tool, a user manipulates tool 10 manually to a position in which the insert is just above and in axial alignment with passage 15 of the carrier part, following which the user turns tool body 10 by means of knurling or serrations 28, and simultaneously advances the tool 10 downwardly, to screw the insert into passage 15, and to the position of FIG. 4. The maximum diameter of serrations 18 of the insert is at least about as small as the minor diameter of threads 14, so that the serrations may be screwed into threads 14 without substantial interference. When the parts reach the FIG. 4 position within the carrier part, engagement of inclined surface 41 with countersink surface 43 of the carrier part halts the motion of tool 10 and the attached insert, at a position in which the insert is automatically located a predetermined distance beneath or axially inwardly of the plane of outer surface 17 of the carrier part. If the parts are constructed precisely as shown in the drawings, the discussed motion limiting engagement between the tool and carrier part occurs at the locations 42 of FIG. 2, which portions of the tool body engage the radially outermost portions of countersink 43.

With the parts in the FIG. 4 condition, a user grasps body 23 of device 22, and presses downwardly on plunger 26, to first store energy in spring 27, and then suddenly and automatically release that energy in the form of a sharp impact applied downwardly through shank 24 to the body of tool 10. If impacting device 22 is not employed, a similar downward stroke on tool 10 may be applied by a hammer driven downwardly against surface 21 of the tool. This downward force drives the inclined or tapered staking or deforming surfaces 41 of the tool downwardly into the material of the insert wall, and into the material of the carrier part, at two localized diametrically opposite positions. The tool thus forms depressions in the insert and carrier part, and in forming these depressions deforms the insert and carrier part material both downwardly and radially outwardly, to stake the parts together in a manner locking the insert against unscrewing rotation. The downward or axial motion of the tool body is limited by engagement of tool surfaces 46 with outer surface 17 of the carrier part, to prevent excessive deformation of the parts. During the downward motion of the tool body, undersize thread 31 of shank 30, which had initially been in the full line position of FIG. 5, moves downwardly relative to the insert to the broken line position of that figure, and through the distance $d$ relative to the insert; while the insert itself may also move downwardly very slightly before surfaces 46 engage the carrier part. After the tool has been driven axially, it is unscrewed from the insert, with the staked areas serving to hold the insert in the carrier part during the tool removal, and prevent unintentional removal of the insert with the tool. Next, a more complete interlock between the insert and carrier part may be formed by expanding the serrated portion of the insert radially outwardly against the wall of carrier part passage 15, and against and into the threads 14 within that passage. This operation is illustrated in FIG. 6, in which an expanding tool 47 is shown. This tool has an externally essentially cylindrical surface 48, terminating in a rounded lower end 49, which is insertible downwardly into the counterbore 20 of the insert, to enlarge that insert and expand the serrations 19 outwardly against threads 14. In some cases, this final expanding operation may be eliminated, with the staked areas serving as the permanent and primary interlock between the parts. It is also contemplated that some but not all of the advantages of the invention could be attained in a variational arrangement in which the deforming surfaces or shoulders 41 might be annular and circularly continuous about axis 16, rather than localized as shown, to deform the insert annularly rather than locally. The axial cross sectional configuration of this annular deforming surface may typically be the same as surfaces 41 of FIG. 2.

I claim:

1. The method of installing within a carrier part an element having first threads to engage said part and having second threads for engaging another member, comprising threadedly connecting said element to a tool structure having threads which engage said second threads but are dimensioned to be loose relative thereto and free for limited relative axial movement, turning said tool structure and said connected element and thereby screwing said first threads of said element into engagement with the carrier part, driving said tool structure axially relative to said element and thereby shifting said threads of the tool structure axially relative to said engaged second threads, and upon and by virtue of said axial movement of the tool structure exerting force against a predetermined portion of said element by a locking portion of said tool structure and thereby displacing said portion of the element in a relation locking the element against unwanted removal from the carrier part.

2. The method of installing within a carrier part an essentially tubular element having external threads to engage said part and having internal threads for engaging another member, comprising threadedly connecting said element to a tool structure having external threads which engage said internal threads of said element but are dimensioned to be loose relative thereto and free for limited relative axial movement, turning said tool structure and said connected element and thereby screwing said external threads of said element into engagement with the carrier part, driving said tool structure axially relative to said element and thereby shifting said threads of the tool structure axially relative to said engaged internal threads of said element, and upon and by virtue of said axial movement of the tool structure exerting force against a predetermined portion of said element by a locking portion of said tool structure and thereby deforming said element in a relation locking it against unwanted removal from the carrier part.

3. The method of installing within a carrier part an essentially tubular element having first threads to engage said part and having second threads for engaging another member, comprising threadedly connecting said element to a tool structure having threads which engage said second threads but are dimensioned to be loose relative thereto and free for limited relative axial movement, turning said tool structure and said connected element and thereby screwing said first threads of said element into engagement with the carrier part, driving said tool structure axially relative to said element and thereby shifting said threads of the tool structure axially relative to said engaged second threads, and upon and by virtue of said axial movement of the tool structure exerting force against an axially outer end portion of said essentially tubular element by a locking portion of said tool structure and thereby locally deforming said end portion of the element in a relation locking it against unwanted removal from the carrier part.

4. The method of installing within a carrier part an element having first threads to engage said part and having second threads for engaging another member, comprising threadedly connecting said element to a tool structure having threads which engage said second threads but are dimensioned to be loose relative thereto and free for limited relative axial movement, turning said tool structure and said connected element and thereby screwing said first threads of said element into engagement with the carrier part, driving said tool structure axially relative to said element and thereby shifting said threads of the tool structure axially relative to said engaged second threads, and during and by virtue of said axial movement of the tool structure exerting force against a predetermined portion of said element with a locking portion of said tool structure and thereby deforming said portion of the element axially inwardly and radially outwardly relative to the carrier part in a relation locking said element against unwanted removal from the carrier part.

5. The method of installing within a carrier part an essentially tubular element having external threads to engage said part and having internal threads for engaging another member, comprising threadedly connecting said element to a tool structure having external threads which engage said internal threads of said element but are dimensioned to be loose relative thereto and free for limited relative axial movement, turning said tool structure and said connected element and thereby screwing said external threads of said element into engagement with the carrier part, driving said tool structure axially relative to said element and thereby shifting said threads of the tool structure axially relative to said engaged internal threads of said element, and during and by virtue of said axial movement of the tool structure exerting force against an axially outer end portion of said essentially tubular element at a plurality of localized circularly spaced locations with a plurality of locking portions of said tool structure which are rigidly fixed relative to said threads of the tool structure, and thereby locally deforming said end portion of the element at circularly spaced locations axially inwardly relative to the carrier part in a relation locking said element against unwanted removal from the carrier part.

6. The method of installing within a carrier part an element having first threads to engage said part and having second threads for engaging another member, comprising threadedly connecting said element to a tool structure having threads which engage said second threads but are dimensioned to be loose relative thereto and free for limited relative axial movement, turning said tool structure and said connected element and thereby screwing said first threads of said element into engagement with the carrier part, driving said tool structure axially relative to said element and thereby shifting said threads of the tool structure axially relative to said engaged second threads, exerting force against a portion of said element with a locking portion of said tool structure and thereby deforming said element in a relation locking it against unwanted removal from the carrier part, removing said tool structure from said element, and then expanding a portion of said element radially outwardly against the carrier part to further lock the element therein.

7. The method of installing within a carrier part an element having first threads to engage said part and having second threads for engaging another member and having a generally annular radially expansible locking portion, comprising threadedly connecting said element to a turning and staking tool having threads which engage said second threads, turning said tool and the connected element and thereby screwing said element into said carrier part, then locally deforming said locking portion of said element at one or more localized regions which are not circularly continuous, while the tool is connected to the element and in a relation locking the element against removal with the tool, unscrewing said tool from the element, and then expanding said locking portion of said element essentially circularly continuously and radially outwardly against the carrier part to further lock the element therein.

8. A tool for installing within a carrier part an element having first threads to engage said part and having second threads of a predetermined standard size in one of the established standard thread series for engaging another member, said tool comprising a tool body having threads which are engageable with said second threads and are close enough to said predetermined standard size to connect said tool body to said second threads in a relation to screw said element into the carrier part by the tool, said threads of the tool body differing slightly in diameter from said predetermined standard size in a relation to be a loose fit relative to said second threads and free for limited relative axial movement, means carried by said body forming a plurality of deforming shoulders at circularly spaced locations mounted for axial movement with said threads of the tool body and positioned to engage and locally deform said element at said spaced locations but not circularly therebetween, upon and by virtue of said axial movement of the threads, in a relation locking the element against unwanted removal from the carrier part, and means forming a stop shoulder on said body which is fixed relative to said threads of the body and relative to said deforming shoulders and which is positioned to engage said carrier part in a relation limiting relative axial movement of the tool body.

9. A tool as recited in claim 8, in which said threads of the tool body are external and slightly undersize in diameter with respect to said predetermined standard size.

10. A tool for installing within a carrier part an element having first threads to engage said part and having second threads of a predetermined standard size in one of the established standard thread series for engaging another member, said tool comprising a tool body having threads which are engageable with said second threads and are close enough to said predetermined standard size to connect said tool body to said second threads in a relation to screw said element into the carrier part by the tool, said threads of the tool body differing slightly in diameter from said predetermined standard size in a relation to be a loose fit relative to said second threads and free for limited relative axial movement, and means carried by said body forming a deforming shoulder mounted for axial movement with said threads of the tool body and which is positioned to engage and deform a portion of said element, upon and by virtue of said axial movement of the threads, in a relation locking the element against unwanted removal from the carrier part, and means forming a stop shoulder on said body which is fixed relative to said threads of the body and relative to said deforming shoulder and which is positioned to engage said carrier part in a relation limiting relative axial movement of the tool body.

References Cited

UNITED STATES PATENTS

| | | | |
|---|---|---|---|
| 2,325,508 | 7/1943 | Haas et al. | 29—240.5 |
| 2,438,744 | 3/1948 | Flynn | 29—240 X |
| 2,577,810 | 12/1951 | Rosan. | |
| 2,637,232 | 5/1953 | McKean | 29—240 X |
| 3,081,808 | 3/1963 | Rosan et al. | |
| 3,162,228 | 12/1964 | Rosan et al. | |
| 3,230,994 | 1/1966 | Rosan | 29—523 X |

CHARLIE T. MOON, Primary Examiner

U.S. Cl. X.R.

29—240.5, 512, 523; 151—22, 41.72